United States Patent
Yang et al.

(10) Patent No.: US 12,450,161 B2
(45) Date of Patent: Oct. 21, 2025

(54) SYSTEMS AND METHODS FOR CACHE ALLOCATION

(71) Applicant: Samsung Electronics Co., Ltd., Suwon-si (KR)

(72) Inventors: Qirui Yang, San Diego, CA (US); Bridget Davis, San Diego, CA (US); Devasena Inupakutika, Rockville, MD (US); Peter Chen, San Diego, CA (US); Bradley Carpenter, Sammamish, WA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 12 days.

(21) Appl. No.: 18/524,412

(22) Filed: Nov. 30, 2023

(65) Prior Publication Data
US 2025/0028646 A1     Jan. 23, 2025

Related U.S. Application Data

(60) Provisional application No. 63/527,908, filed on Jul. 20, 2023.

(51) Int. Cl.
G06F 12/0895     (2016.01)
G06F 12/123     (2016.01)

(52) U.S. Cl.
CPC ........ G06F 12/0895 (2013.01); G06F 12/123 (2013.01)

(58) Field of Classification Search
CPC ............... G06F 12/023; G06F 12/0846; G06F 12/0864; G06F 12/0871; G06F 12/0886;
(Continued)

(56) References Cited

U.S. PATENT DOCUMENTS 5,651,136 A    7/1997    Denton et al.
7,127,465 B2    10/2006    Rao et al.
(Continued)

FOREIGN PATENT DOCUMENTS

CN     103699497 B     1/2017

OTHER PUBLICATIONS

Jeremic, Nikolaus, et al., "On Adapting the Cache Block Size in SSD Caches," 2021 IEEE International Conference on Networking, Architecture and Storage (NAS), IEEE, Oct. 2021, 8 pages, XP034027241.
(Continued)

*Primary Examiner* — Aracelis Ruiz
(74) *Attorney, Agent, or Firm* — Lewis Roca Rothgerber Christie LLP

(57) ABSTRACT

A method for data storage includes receiving, by a storage device, a read request for data, the read request being associated with a request size, determining that a first cache area associated with a first portion of the data is in a first portion of a cache, the first cache area having a first size that is smaller than the request size, determining that a second cache area associated with a second portion of the data is in a second portion of the cache, the second cache area having a second size that is smaller than the request size and differently sized than the first size, and based on the read request, reading the first portion of the data from the first cache area and reading the second portion of the data from the second cache area.

17 Claims, 4 Drawing Sheets

(58) Field of Classification Search
CPC ............ G06F 12/0888; G06F 12/0895; G06F 12/123; G06F 12/127; G06F 12/128; G06F 2212/1024; G06F 2212/1044; G06F 2212/214; G06F 2212/284; G06F 2212/313; G06F 2212/502

See application file for complete search history.

(56) References Cited

U.S. PATENT DOCUMENTS

| | | |
|---|---|---|
| 8,341,380 B2 | 12/2012 | Deming et al. |
| 8,566,534 B1 | 10/2013 | Pruthi et al. |
| 11,341,062 B2 | 5/2022 | Yang et al. |
| 11,599,461 B2 | 3/2023 | Scharland et al. |
| 11,604,735 B1 | 3/2023 | Segev et al. |
| 2003/0014603 A1* | 1/2003 | Sasaki ................ G06F 12/126 711/158 |
| 2011/0016090 A1* | 1/2011 | Krishnaprasad ........ G06F 3/067 707/648 |
| 2017/0139792 A1 | 5/2017 | Gupta et al. |
| 2018/0307420 A1* | 10/2018 | Yoon .................... G06F 3/0619 |
| 2022/0188235 A1 | 6/2022 | Gupta et al. |

OTHER PUBLICATIONS

Yang, Qirui, et al., "AdaCache: A Disaggregated Cache System with Adaptive Block Size for Cloud Block Storage," Arxiv.Org, Jun. 2023, 12 pages, XP091551377.

* cited by examiner

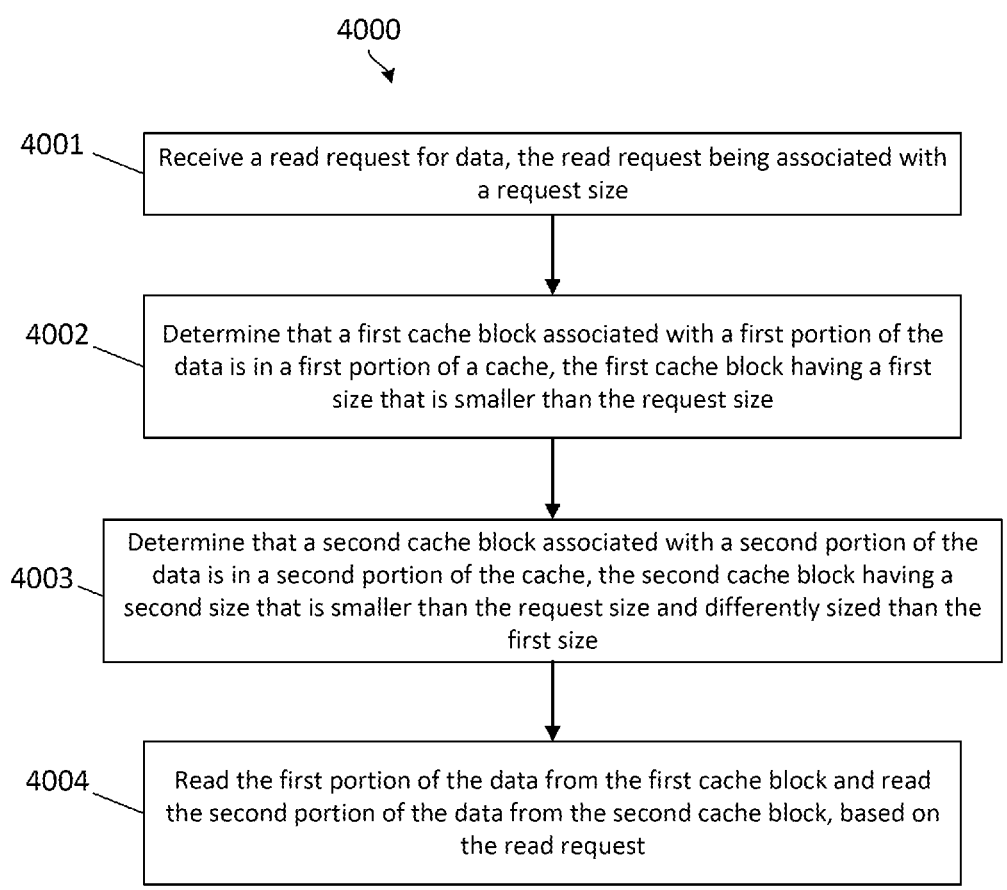

SYSTEMS AND METHODS FOR CACHE ALLOCATION

CROSS-REFERENCE TO RELATED APPLICATION(S)

This application claims priority to, and benefit of, U.S. Provisional Application Ser. No. 63/527,908, filed on Jul. 20, 2023, entitled "MEMORY EFFICIENT CACHE MANAGEMENT WITH ADAPTIVE CACHE LINE SIZE," the entire content of which is incorporated herein by reference.

FIELD

Aspects of some embodiments of the present disclosure relate to systems and methods for cache-area allocation.

BACKGROUND

In the field of computer storage, a system may include a host and one or more storage devices connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

Accordingly, there may be a need for methods, systems, and devices that are suitable for improving the use of storage devices in storage systems.

The present background section is intended to provide context only, and the disclosure of any embodiment or concept in this section does not constitute an admission that said embodiment or concept is prior art.

SUMMARY

Aspects of some embodiments of the present disclosure relate to computer storage systems, and provide improvements to cache-area allocation (e.g., cache block allocation) by reducing cache pollution and bandwidth pollution. As used herein, "pollution" refers, at least in part, to wasted resources of the storage system.

According to some embodiments of the present disclosure, there is provided a method for data storage, the method including receiving, by a storage device, a read request for data, the read request being associated with a request size, determining that a first cache area associated with a first portion of the data is in a first portion of a cache, the first cache area having a first size that is smaller than the request size, determining that a second cache area associated with a second portion of the data is in a second portion of the cache, the second cache area having a second size that is smaller than the request size and differently sized than the first size, and based on the read request, reading the first portion of the data from the first cache area and reading the second portion of the data from the second cache area.

The first portion of the cache may include a first cache group that is divided into cache areas having the first size, and the second portion of the cache may include a second cache group that is divided into cache areas having the second size.

The determining that the first cache area is in the first portion of the cache may include checking a first lookup data structure associated with the first size, and the determining that the second cache area is in the second portion of the cache may include checking a second lookup data structure associated with the second size.

The first lookup data structure may include a first key-value store and the second lookup data structure may include a second key-value store.

The first portion of the cache may include a first cache line and the second portion of the cache may include a second cache line, the first cache line being separated from the second cache line.

The first cache area and the second cache area may be linked by a first least recently used (LRU) list.

The first LRU list may include a group LRU list, and the first cache area and the second cache area may be linked by a second LRU list that is different from the first LRU list.

According to some other embodiments of the present disclosure, there is provided a storage device, including a cache, and a processing circuit, wherein the processing circuit is configured to receive a read request for data, the read request being associated with a request size, determine that a first cache area associated with a first portion of the data is in a first portion of a first cache, the first cache area having a first size that is smaller than the request size, determine that a second cache area associated with a second portion of the data is in a second portion of the cache, the second cache area having a second size that is smaller than the request size and differently sized than the first size, and based on the read request, read the first portion of the data from the first cache area and reading the second portion of the data from the second cache area.

The first portion of the cache may include a first cache group that is divided into cache areas having the first size, and the second portion of the cache may include a second cache group that is divided into cache areas having the second size.

The processing circuit may be configured to determine that the first cache area is in the first portion of the cache by checking a first lookup data structure associated with the first size, and determine that the second cache area is in the second portion of the cache by checking a second lookup data structure associated with the second size.

The first lookup data structure may include a first key-value store and the second lookup data structure may include a second key-value store.

The first portion of the cache may include a first cache line and the second portion of the cache may include a second cache line, the first cache line being separated from the second cache line.

The first cache area and the second cache area may be linked by a first least recently used (LRU) list.

The first LRU list may include a group LRU list, and the first cache area and the second cache area may be linked by a second LRU list that is different from the first LRU list.

According to some other embodiments of the present disclosure, there is provided a system for data storage, including a processor, and a memory storing instructions, which, based on being executed by the processor, cause the processor to perform receiving a read request for data, the read request being associated with a request size, determining that a first cache area associated with a first portion of the data is in a first portion of a cache, the first cache area having a first size that is smaller than the request size, determining that a second cache area associated with a second portion of the data is in a second portion of the cache, the second cache area having a second size that is smaller than the request size and differently sized than the first size, and based on the read request, reading the first portion of the data from the first cache area and reading the second portion of the data from the second cache area.

The first portion of the cache may include a first cache group that is divided into cache areas having the first size, and the second portion of the cache may include a second cache group that is divided into cache areas having the second size.

The determining that the first cache area is in the first portion of the cache may include checking a first lookup data structure associated with the first size, and the determining that the second cache area is in the second portion of the cache may include checking a second lookup data structure associated with the second size.

The first lookup data structure may include a first key-value store and the second lookup data structure may include a second key-value store.

The first portion of the cache may include a first cache line and the second portion of the cache may includes a second cache line, the first cache line being separated from the second cache line.

The first cache area and the second cache area may be linked by a first least recently used (LRU) list and by a second LRU list that is different from the first LRU list.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4 is a flowchart depicting example operations of a method for adaptive cache-block allocation, according to some embodiments of the present disclosure.

Figure 1:
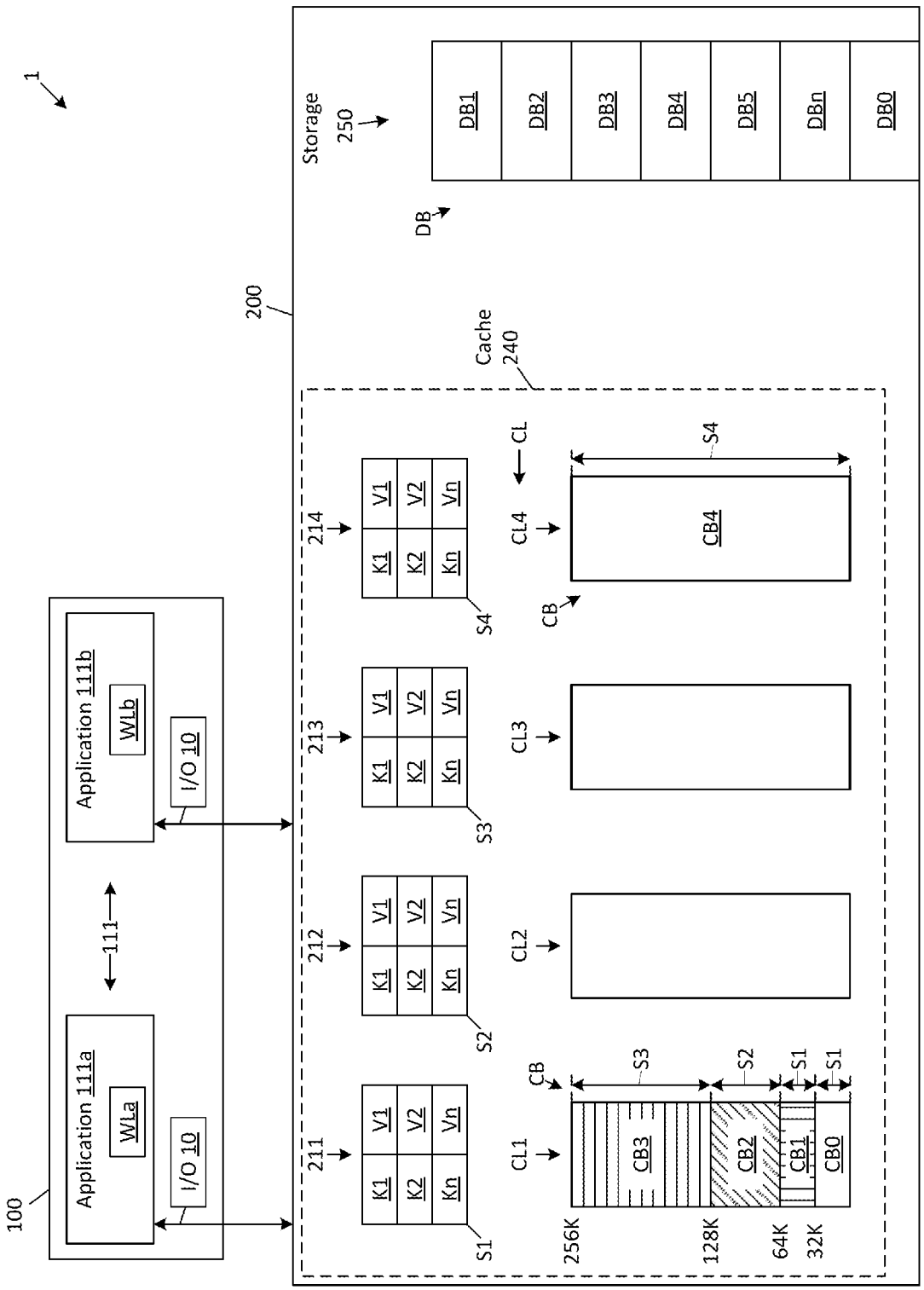
FIG. 1 is a system diagram depicting a system for adaptive cache-block allocation, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, or Z," "at least one of X, Y, and Z," and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices (e.g., solid-state drives (SSDs)) communicably coupled to the host. The storage devices may store data associated with applications running on the host.

A storage device may include a cache and a storage. The cache may include cache lines. The cache may serve as a part of a memory (e.g., a dynamic random-access memory (DRAM)) for quicker data access and processing than with the storage. For example, the storage may include a non-volatile memory (NVM), which stores data in a manner that takes longer to access and process than data stored in the memory. The cache lines may include copies of data that has recently been accessed from the storage (e.g., data that has been more recently accessed than some of the data in the storage).

Conventionally, a cache line of a storage device may be arranged based on a fixed cache-block size (e.g., 16 kibibytes (KiB)). For example, data that is copied from the storage, in response to an input/output (I/O) request, may be placed in the cache line according to an offset and a request size (e.g., a requested size of data associated with the I/O request) and according to the fixed cache-block size of the cache line. Such fixed size cache-block systems may experience problems with cache pollution and bandwidth pollution.

Aspects of one or more embodiments of the present disclosure provide improvements to cache management by providing for adaptive cache-area allocation (e.g., cache-block allocation), which may reduce cache pollution and bandwidth pollution.

Different applications running on the host may have diverse workloads with different I/O patterns. For example, in some systems, about 60% of requests from a first application may have request sizes of 4 KiB or smaller, while about 50% of requests from a second application may have request sizes of about 32 KiB or greater. Applications that process workloads having I/O requests associated with small request sizes, such as transactional databases, may perform better with small cache-block sizes. For example, using small cache-block sizes for small request sizes may result in less cache pollution and less bandwidth pollution. On the other hand, applications that process workloads having large request sizes, such as multimedia systems, may perform better with large cache-block sizes. For example, using large cache-block sizes for large I/O requests may result in lower I/O counts (e.g., a number of I/Os for processing a given request).

Each cache block may require about 40 bytes of metadata. For example, the metadata may include identification information and location information for finding data, associated with a given request, in a storage device. For example, the identification information and location information may include information stored in a lookup data structure, such as the keys and the values of a key-value (KV) store. Using a large number of small cache-block sizes may result in large memory usage for each of the blocks and their corresponding metadata. For example, a commonly used 16 KiB cache-block size may result in 960 gibibytes (GiB) of in-memory metadata for a 384 tebibyte (TiB) cache. On the other hand, using a small number of large cache-block sizes may consume less memory but may cause more cache pollution and more bandwidth pollution than using a large number of small cache-block sizes.

Aspects of one or more embodiments of the present disclosure provide improvements to cache management by storing data in the cache of a storage device with differently sized cache blocks, based on a given request size.

In some embodiments, as discussed in further detail below, the storage device may generate cache-miss intervals by: keeping (e.g., maintaining) a key-value store for each cache-block size (e.g., 32 KiB, 64 KiB, 128 KiB, and 256 KiB); aligning an I/O offset of an I/O request with each cache-block size; searching from the smallest cache-block size to avoid inconsistency; increasing a begin offset by the cache-block size; and finishing when the begin offset meets an end offset.

In some embodiments, the storage device may perform "greedy" cache-block allocation by: starting from the largest cache-block size to ensure a minimum number of cache blocks are used for a cache-block allocation; checking the alignment of each I/O offset; and finishing when a begin I/O offset meets an end I/O offset.

In some embodiments, the storage device may divide a cache space into non-contiguous pieces for grouping.

In some embodiments, the storage device may perform group-based cache organization to reduce problematic cache fragmentation by: putting cache blocks of the same size into groups (e.g., identically-sized groups); storing cache blocks physically adjacently in a same group; and replacing a whole group when the cache is full.

In some embodiments, the storage device may perform a two-level cache replacement scheme to improve a cache hit ratio by: maintaining two least recently used (LRU) lists (a global LRU list that links all of the cache blocks in the cache and a group LRU list that links all cache groups in the cache); and replacing the tail (e.g., the oldest cache block) of the global LRU list if a newly allocated cache-block size is the same as the cache-block size of the tail or replacing the tail of the group LRU list to free up space in the cache.

Accordingly, the present disclosure provides for a storage system with improved cache performance by: adapting the cache-line size (e.g., cache-block sizes) based on workload characteristics; reducing a memory footprint of large-scale cache systems; providing flexibility to work with a variety of caching scenarios; and running sufficiently fast to suit online applications.

FIG. 1 is a system diagram depicting a system for adaptive cache-block allocation, according to some embodiments of the present disclosure.

Referring to FIG. 1, a system 1 may include a host 100 and a storage device 200 communicably coupled with the host 100. The host 100 may include one or more applications 111 running on computing resources of the host 100. For example, the host may include a first application 111a processing a first workload WLa and a second application 111b processing a second workload WLb. To process their respective workloads, the applications 111 may send requests to access data stored at the storage device 200. For example, the first application 111a and the second application 111b may send respective read requests 10 to the storage device 200.

The storage device 200 may include a cache 240 and a storage 250. The cache 240 may include one or more cache lines CL for storing cache areas (e.g., cache blocks CB, including a zeroth cache block CB0 through a fourth cache block CB4). In some embodiments, the cache lines CL may be logically separate but physically together (e.g., contiguous). In some embodiments, cache lines CL may be separated into non-contiguous pieces (e.g., non-contiguous sections). Some of the cache blocks CB may be differently sized than some of the other cache blocks CB. For example, some of the cache blocks CB may have a first size S1; some of the cache blocks CB may have a second size S2; some of the cache blocks CB may have a third size S3; and some of the cache blocks CB may have a fourth size S4. For example, the first size S1 may be 32 KiB; the second size S2 may be 64 KiB; the third size S3 may be 128 KiB; and the fourth size may be 256 KiB. The cache blocks CB may be associated with data stored in respective ones of data blocks DB in the storage 250. For example, the zeroth cache block CB0 may store a copy of the data stored in a zeroth data block DB0.

The cache 240 may be associated with one or more lookup data structures (e.g., a first lookup data structure 211 through a fourth lookup data structure 214). The lookup data structures may keep track of (e.g., maintain) the locations of the data stored in the storage device 200. For example, the first lookup data structure 211 may maintain the locations of data associated with cache blocks CB having the first size S1; the second lookup data structure 212 may maintain the locations of data associated with cache blocks CB having the second size S2; the third lookup data structure 213 may maintain the locations of data associated with cache blocks CB having the third size S3; and the fourth lookup data structure 214 may maintain the locations of data associated with cache blocks CB having the fourth size S4. In some embodiments, the lookup data structures may be key-value stores, which store keys (e.g., a first key K1 through an n-th key Kn, where n is an integer greater than zero) and values (e.g., a first value V1 through an n-th value Vn, where n is an integer greater than zero) for locating requested data.

In some embodiments, the storage device 200 may receive a read request 10 from the host 100. The read request 10 may be associated with a request size 12 (see FIG. 2). The request size 12 may correspond to an aligned request range. For example, the read request 10 may include an original request offset and end address (e.g., an original request offset and information associated with an original request length 11). The storage device 200 may determine the request size 12 by aligning the original request offset and the end address to the smallest block size of the cache 240. In some embodiments, the storage device 200 may check the lookup data structures (e.g., 211-214) for data associated with the read request 10. The storage device 200 may generate a list of missing intervals for all parts of the read request 10 that are missing from the cache 240. The storage device 200 may iterate through the read request 10 to find out all the missing intervals. For example, because the cache 240 uses variable (e.g., more than one) cache-block sizes, the storage device may check the lookup data structures (e.g., in-memory key-value stores) for every cache-block size (e.g., S1-S4) to determine if any part of the data associated with the read request 10 is cached (e.g., stored) under each respective cache-block size.

Figure 2:
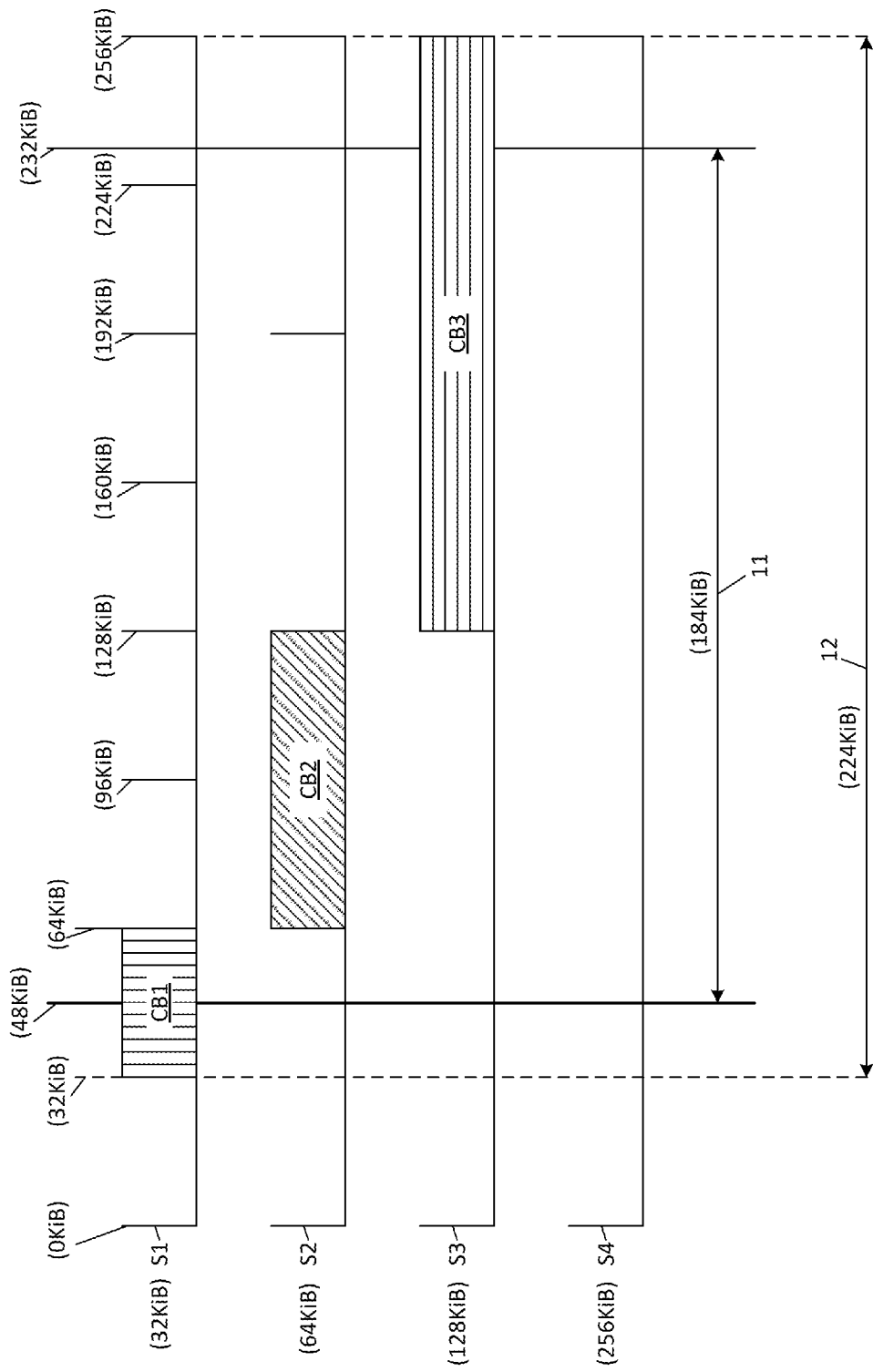
FIG. 2 is diagram depicting an example of adaptive cache-block allocation, according to some embodiments of the present disclosure.

FIG. 2 is diagram depicting an example of adaptive cache-block allocation, according to some embodiments of the present disclosure.

Referring to FIG. 2, the read request 10 may be associated with an original request offset of, for example, 48 KiB, and an original request length 11 of 184 KiB. The cache 240 (see FIGS. 1 and 3) may employ cache-block sizes of, for example, 32 KiB, 64 KiB, 128 KiB, and 256 KiB. A later portion of the data associated with the read request 10 (e.g., from 128 KiB to 232 KiB) may be cached under the 128 KiB block size (e.g., as a third cache block CB3). The request aligned request range may be from 32 KiB to 256 KiB, having a request size 12 of 224 KiB. Because the original request length 11, associated with the read request 10, is 184 KiB in this example, the storage device may determine the request size 12 to be equal to 224 KiB based on seven of the smallest cache-block sizes (e.g., 32 KiB) being used to cover (e.g., store) the data associated with the read request 10 based on the offset of 48 KiB and the original request length 11 of 184 KiB.

Within the requested range (e.g., within the request size 12 of 224 KiB and the corresponding range of cache-block sizes), the storage device 200 may search from the smallest cache-block size (e.g., 32 KiB) and determine whether a current address associated with the read request 10 is cached under any of the cache-block sizes. The storage device 200 may align the current address to different cache-block sizes (e.g., using an equation relating an aligned offset to a request offset and a cache-block size). For example, the storage device 200 may determine aligned offsets of 32 KiB, 0, 0, and 0 for the cache-block sizes of 32 KiB, 64 KiB, 128 KiB, and 256 KiB, respectively. The storage device 200 may use the aligned offsets to search the lookup data structures (e.g., the in-memory key-value store) of each respective cache-block size. If the result of the lookup-data-structure search is all misses (e.g., cache misses), the storage device 200 may determine that the current address with the smallest cache-block size (e.g., the interval between 32 KiB and 64 KiB) is not cached. The storage device 200 may add the interval to the list of missing intervals. In some embodiments, to allocate the largest possible cache block for the missing intervals, the storage device 200 may merge missing intervals that are contiguous. The storage device 200 may move on to the next address associated with the read request 10 (e.g., 64 KiB) and may repeat the process. After checking lookup data structures, the storage device 200 may get a complete list of missing intervals. For example, the interval from 32 KiB to 128 KiB may be missing in the cache 240. For each missing interval in the list of missing intervals, the storage device 200 may allocate cache blocks CB using the largest possible cache-block size (e.g., largest cache-block size that fits the missing interval). Using the largest possible cache-block size to fit a missing interval may be referred to as "greedy allocation." Greedy allocation ensures that the storage device 200 reduces a number of allocated cache blocks CB and I/O counts. To determine whether a cache-block size is suitable for the missing interval, the storage device 200 may determine whether a cache block is within the range of the missing intervals because the addresses that go beyond these intervals may have been cached. For example, the storage device 200 may determine how to allocate (e.g., adaptively allocate) cache-block sizes for the missing interval from 32 KiB to 128 KiB by determining that the largest possible cache-block size for the missing interval is 32 KiB because the larger cache-block sizes (64 KiB, 128 KiB, and 256 KiB) would start beyond the missing interval. For example, there would be an overlap if a 64 KiB cache block were used at the beginning, from 32 KiB to 96 KiB, followed by another 64 KiB cache block for the interval from 96 KiB to 128 KiB. For the remaining missing interval from 64 KiB to 128 KiB, the largest possible cache-block size, for this example, is 64 KiB because the interval from 64 KiB to 128 KiB is within the range of the missing interval (64 KiB to 128 KiB). At the end of this greedy allocation process, the storage device 200 may cache two cache blocks CB, including the first cache block CB1 having the first size (e.g., 32 KiB) from 32 KiB to 64 KiB and the second cache block CB2 having the second size S2 (e.g., 64 KiB) from 64 KiB to 128 KiB.

Assuming N is the original request length 11, M is the number of different cache-block sizes, and K is the total number of cache blocks CB in the cache 240, a corresponding greedy cache-block-allocation algorithm would have a time complexity of fixed-size and adaptive cache-block allocation of O(K*N) and O(K*N*M), respectively. (The O in the equations corresponds to "Big O notation.") In some embodiments, M may be set to a constant value, such as four, as depicted in the example of FIG. 2, where the time complexity may be approximated as O(K*N), which is equivalent to the fixed-size cache-block allocation. The space complexity of the algorithm may be identical to the fixed-size cache-block allocation, which is O(K).

By using both small cache blocks and large cache blocks, adaptive cache-block allocation may provide improvements over fixed-size cache-block allocation schemes for processing dynamic workloads (e.g., dynamic cloud workloads). However, adaptive cache-block allocation may result in problematic fragmentation. For example, as can be seen in FIG. 1, using small cache blocks CB and large cache blocks CB in the same cache line CL may result in many scattered small holes, such as the zeroth cache block CB0, which may be hard to use for other requests. For example, most request sizes may be greater than the 32 KiB cache-block size of the zeroth cache block CB0. When the cache 240 gets full and adaptive cache blocks CB get allocated, the cache space may become divided into non-contiguous variable-sized pieces. To address problematic fragmentation, some embodiments of the present disclosure may incorporate group-based cache organization, as discussed below with respect to FIG. 3.

Figure 3:
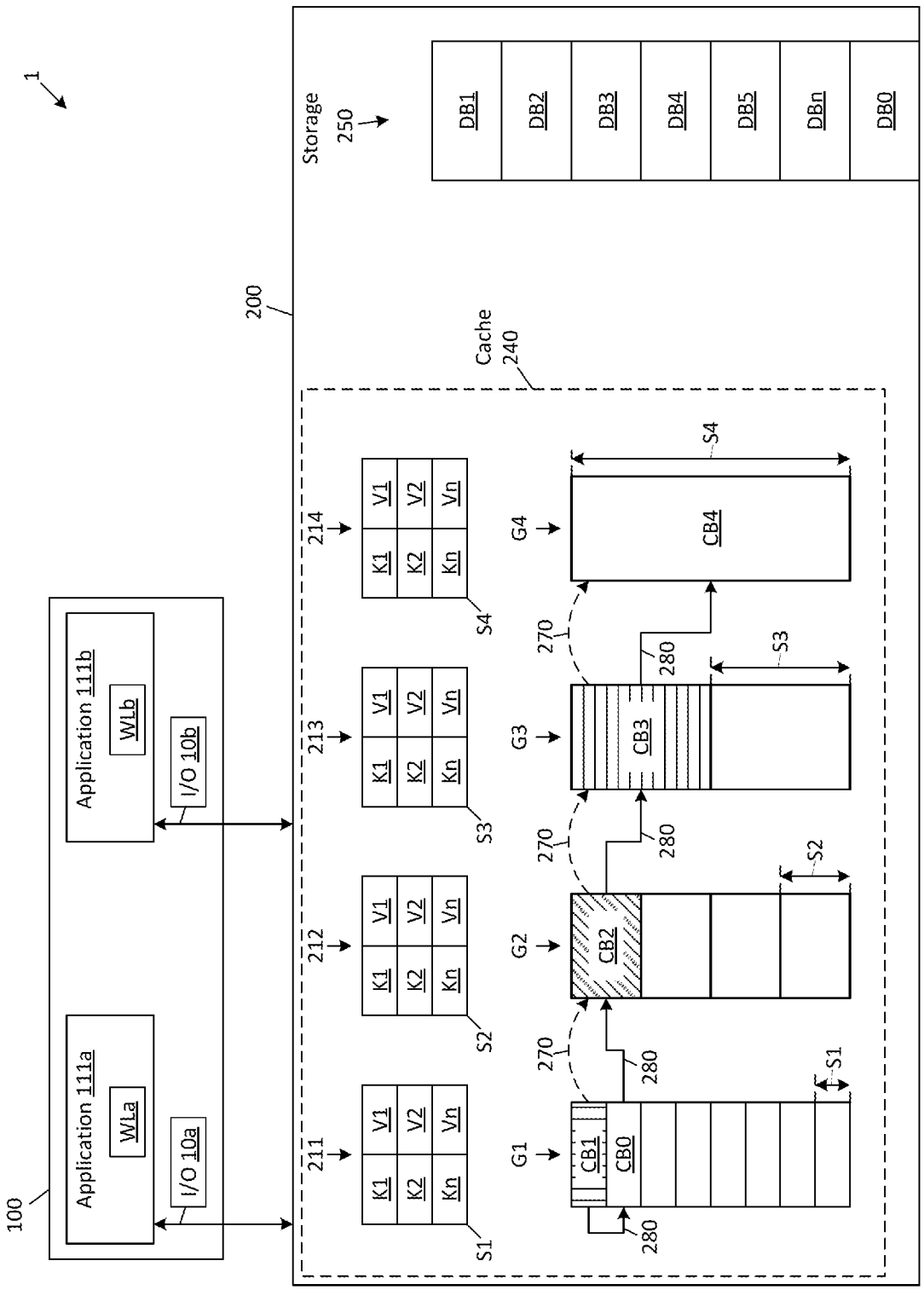
FIG. 3 is a system diagram depicting examples of group-based cache organization and two-level cache replacement in a system for adaptive cache-block allocation, according to some embodiments of the present disclosure.

FIG. 3 is a system diagram depicting examples of group-based cache organization and two-level cache replacement in the system for adaptive cache-block allocation, according to some embodiments of the present disclosure.

Referring to FIG. 3, in some embodiments, the storage device 200 may group cache blocks CB of the same cache-block size together in groups (e.g., identical-sized groups). For example, cache blocks (e.g., the zeroth cache block CB0 and the first cache block CB1) belonging to the same group (e.g., a first group G1) may be stored physically adjacent to each other in the cache 240. Accordingly, when the cache 240 is full, a whole group (e.g., the first group G1) may be replaced to create a contiguous piece of cache space for cache-block allocation.

In some embodiments, the storage device 200 may choose the largest cache-block size (e.g., the fourth size S4) as the group size for each group (e.g., the first group G1 through the fourth group G4). Accordingly, replacement of a whole group may free up enough cache space for the largest cache block CB allocation. In the case of small block allocation, the replacement of a whole group may create an open group that may be used to allocate many cache blocks of that block size.

As an example of group-based cache organization, the cache-block sizes may include the first size S1 of 32 KiB, the second size S2 of 64 KiB, the third size S3 of 128 KiB, and the fourth size S4 of 256 KiB. The group sizes may all be 256 KiB. The first group G1, the second group G2, and the third group G3 may be open (e.g., may have cache blocks available for allocation). The fourth group G4 may be a full group, based on storing the fourth cache block CB4 having a size of 256 KiB. In some embodiments, the group sizes may all be equal.

To allocate a cache block CB, the storage device 200 may determine whether the cache 240 is full. If the cache 240 is not full, the storage device 200 may determine whether there is an open group with the same block size as the cache block CB being allocated. For example, a slab allocator (e.g., a software and/or hardware component of the storage system that manages space by groups) may determine if there is an open group with a suitable cache-block size. If such an open group exists, a cache block CB may be allocated from the open group with the suitable cache-block size. If, on the other hand, there is no such open group, the storage device may create a new group and may allocate a cache block CB from the new group. If the cache 240 is full, the storage device 200 may replace an entire group. For example, the storage device 200 may replace a whole group (e.g., the fourth group G4) to free up enough cache space for the largest block size. In some embodiments, and as discussed below in further detail, the storage device 200 may replace an entire group based on one or more LRU lists to replace the oldest (e.g., the least recently used) group, which, as depicted in FIG. 3, is also the fourth group G4.

For example, in some embodiments, the storage device 200 may use (e.g., may follow or provide) a group-based LRU replacement policy. In such embodiments, a first LRU list may include (e.g., may be) a group LRU list 270. In such embodiments, when a cache block CB is accessed, the group that contains the cache block CB may be promoted to the head of the group LRU list 270 (e.g., may be designated as the most-recently-used cache block CB). When the cache 240 is full, the storage device 200 may replace the group that is at the tail of the group LRU list 270 (e.g., may replace and free up memory space associated with the least-recently-used group). As depicted in FIG. 3, the first cache block CB1 is at the head of the group LRU list 270, and the fourth cache block CB4 is at the tail of the group LRU list 270. Although a cache miss may trigger a write-back I/O of the whole group to be evicted, an I/O volume associated with the write-back I/O may be smaller than an I/O volume associated with using large fixed-size cache blocks CB. One benefit to evicting an entire group in an adaptive cache-block-allocation system is that all of the space formerly associated with the group in the cache 240 may be freed up (e.g., freed up at once) and used to store a number of small cache blocks CB from other (e.g., future) data access requests.

In some embodiments, the storage device 200 may use (e.g., may follow or provide) a global-cache-block LRU replacement policy. In such embodiments, a second LRU list may include (e.g., may be) a global LRU list 280. In some embodiments, the storage device 200 may incorporate a global LRU list 280 in addition to a group LRU list 270. The global LRU list may allow the storage device 200 to remove less-frequently-accessed (or "cold") cache blocks CB that are in the same group as frequently accessed (or "hot") cache blocks CB. Such cold cache blocks CB may cause cache pollution based on using up space in the cache 240 that may not be used to accommodate more-frequently-accessed cache blocks CB. As depicted in FIG. 3, the first cache block CB1 is at the head of the global LRU list 280 and the fourth cache block CB4 is at the tail of the global LRU list 280.

In some embodiments, all the cache blocks CB in the cache 240 may be linked (e.g., logically linked) using the global LRU list 280. If the cache 240 is full, the storage device 200 may try to allocate a new cache block CB by determining whether the cache block CB at the tail of the global LRU list 280 is the same size as the new cache block CB. If the cache block CB at the tail of the global LRU list 280 has the same size as the new cache block CB, then the storage device 200 may replace the cache block CB at the tail of the global LRU list 280. The storage device 200 may also promote both the cache block CB at the tail of the global LRU list 280 and its group to the head of both the group LRU list 270 and the global LRU list 280. If the cache block CB at the tail of the global LRU list 280 is not the same size as the new cache block CB, the storage device 200 may use the group-based LRU replacement policy to replace a whole group. For example, the storage device 200 may replace the group at the tail of the group LRU list 270.

In some embodiments, the storage device 200 may use a lockless design to avoid high lock-contention overhead when the cache 240 is accessed in parallel.

FIG. 4 is a flowchart depicting example operations of a method for adaptive cache-block allocation, according to some embodiments of the present disclosure.

Referring to FIG. 4, the method 4000 may include the following example operations. A storage device 200 may receive a read request 10 for data (see FIGS. 1 and 3) (operation 4001). The read request 10 may be associated with a request size 12 (operation 4001). The storage device 200 may determine that a first cache block CB1 associated with a first portion of the data is in a first portion of a cache 240 (operation 4002). The first cache block CB1 may have a first size that is smaller than the request size 12 (operation 4002). The storage device 200 may determine that a second cache block CB2 associated with a second portion of the data is in a second portion of the cache 240 (operation 4003). The second cache block CB2 may have a second size that is smaller than the request size 12 and differently sized (e.g., larger in size or smaller in size) than the first size (operation 4003). The storage device 200 may read the first portion of the data from the first cache block CB1 and may read the second portion of the data from the second cache block CB2, based on the read request 10 (operation 4004).

Accordingly, aspects of some embodiments of the present disclosure may provide improvements to computer storage systems by providing adaptive cache-block sizes (or variable-sized cache-block allocation) to process data requests in a manner that may reduce cache pollution and bandwidth pollution.

Example embodiments of the disclosure may extend to the following statements, without limitation:

Statement 1. An example method includes: receiving, by a storage device, a read request for data, the read request being associated with a request size, determining that a first cache area associated with a first portion of the data is in a first portion of a cache, the first cache area having a first size that is smaller than the request size, determining that a second cache area associated with a second portion of the data is in a second portion of the cache, the second cache area having a second size that is smaller than the request size and differently sized than the first size, and based on the read request, reading the first portion of the data from the first cache area and reading the second portion of the data from the second cache area.

Statement 2. An example method includes the method of statement 1, wherein the first portion of the cache includes a first cache group that is divided into cache areas having the first size, and the second portion of the cache includes a second cache group that is divided into cache areas having the second size.

Statement 3. An example method includes the methods of any of statements 1 and 2, wherein the determining that the first cache area is in the first portion of the cache includes checking a first lookup data structure associated with the first size, and the determining that the second cache area is in the second portion of the cache includes checking a second lookup data structure associated with the second size.

Statement 4. An example method includes the method of statement 3, wherein the first lookup data structure includes a first key-value store and the second lookup data structure includes a second key-value store.

Statement 5. An example method includes the methods of any of statements 1-4, wherein the first portion of the cache includes a first cache line and the second portion of the cache includes a second cache line, the first cache line being separated from the second cache line.

Statement 6. An example method includes the methods of any of statements 1-5, wherein the first cache area and the second cache area are linked by a first least recently used (LRU) list.

Statement 7. An example method includes the methods of any of statements 1-6, wherein the first LRU list includes a group LRU list, and the first cache area and the second cache area are linked by a second LRU list that is different from the first LRU list.

Statement 8. An example device for performing the method of any of statements 1-7 includes a cache and a processing circuit.

Statement 9. An example system for performing the method of any of statements 1-7 includes a processor, and a memory storing instructions, which, based on being executed by the processor cause the processor to perform the method of any of statements 1-7.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for data storage, the method comprising:
    receiving, by a storage device, a read request for data, the read request being associated with a request size;
    determining that a first cache area associated with a first portion of the data is in a first cache group of a cache, the first cache area having a first size that is smaller than the request size, the first cache group comprising at least two cache areas having the first size;
    determining that a second cache area associated with a second portion of the data is in a second cache group of the cache, the second cache area having a second size that is smaller than the request size and differently sized than the first size, the second cache group comprising at least two cache areas having the second size; and
    based on the read request, reading the first portion of the data from the first cache area and reading the second portion of the data from the second cache area.

2. The method of claim 1, wherein:
    the determining that the first cache area is in the first cache group of the cache comprises checking a first lookup data structure associated with the first size; and
    the determining that the second cache area is in the second cache group of the cache comprises checking a second lookup data structure associated with the second size.

3. The method of claim 2, wherein the first lookup data structure comprises a first key-value store and the second lookup data structure comprises a second key-value store.

4. The method of claim 1, wherein the first cache group of the cache comprises a first cache line and the second cache group of the cache comprises a second cache line, the first cache line being separated from the second cache line.

5. The method of claim 1, wherein the first cache area and the second cache area are linked by a first least recently used (LRU) list.

6. The method of claim 5, wherein:
    the first LRU list comprises a group LRU list; and
    the first cache area and the second cache area are linked by a second LRU list that is different from the first LRU list.

7. A storage device comprising:
    a cache; and
    a processing circuit,
    wherein the processing circuit is configured to:
        receive a read request for data, the read request being associated with a request size;
        determine that a first cache area associated with a first portion of the data is in a first cache group of a cache, the first cache area having a first size that is smaller than the request size, the first cache group comprising at least two cache areas having the first size;
        determine that a second cache area associated with a second portion of the data is in a second cache group of the cache, the second cache area having a second size that is smaller than the request size and differently sized than the first size, the second cache group comprising at least two cache areas having the second size; and
        based on the read request, read the first portion of the data from the first cache area and reading the second portion of the data from the second cache area.

8. The storage device of claim 7, wherein the processing circuit is configured to:
    determine that the first cache area is in the first cache group of the cache by checking a first lookup data structure associated with the first size; and
    determine that the second cache area is in the second cache group of the cache by checking a second lookup data structure associated with the second size.

9. The storage device of claim 8, wherein the first lookup data structure comprises a first key-value store and the second lookup data structure comprises a second key-value store.

10. The storage device of claim 7, wherein the first cache group of the cache comprises a first cache line and the second cache group of the cache comprises a second cache line, the first cache line being separated from the second cache line.

11. The storage device of claim 7, wherein:
    the first cache area and the second cache area are linked by a first least recently used (LRU) list.

12. The storage device of claim 11, wherein:
the first LRU list comprises a group LRU list; and
the first cache area and the second cache area are linked by a second LRU list that is different from the first LRU list.

13. A system for data storage, the system comprising:
a processor; and
a memory storing instructions, which, based on being executed by the processor, cause the processor to perform:
  receiving a read request for data, the read request being associated with a request size;
  determining that a first cache area associated with a first portion of the data is in a first cache group of a cache, the first cache area having a first size that is smaller than the request size, the first cache group comprising at least two cache areas having the first size;
  determining that a second cache area associated with a second portion of the data is in a second cache group of the cache, the second cache area having a second size that is smaller than the request size and differently sized than the first size, the second cache group comprising at least two cache areas having the second size; and
  based on the read request, reading the first portion of the data from the first cache area and reading the second portion of the data from the second cache area.

14. The system of claim 13, wherein:
the determining that the first cache area is in the first cache group of the cache comprises checking a first lookup data structure associated with the first size; and
the determining that the second cache area is in the second cache group of the cache comprises checking a second lookup data structure associated with the second size.

15. The system of claim 14, wherein the first lookup data structure comprises a first key-value store and the second lookup data structure comprises a second key-value store.

16. The system of claim 13, wherein the first cache group of the cache comprises a first cache line and the second cache group of the cache comprises a second cache line, the first cache line being separated from the second cache line.

17. The system of claim 13, wherein the first cache area and the second cache area are linked by a first least recently used (LRU) list and by a second LRU list that is different from the first LRU list.

* * * * *